Figure 1:
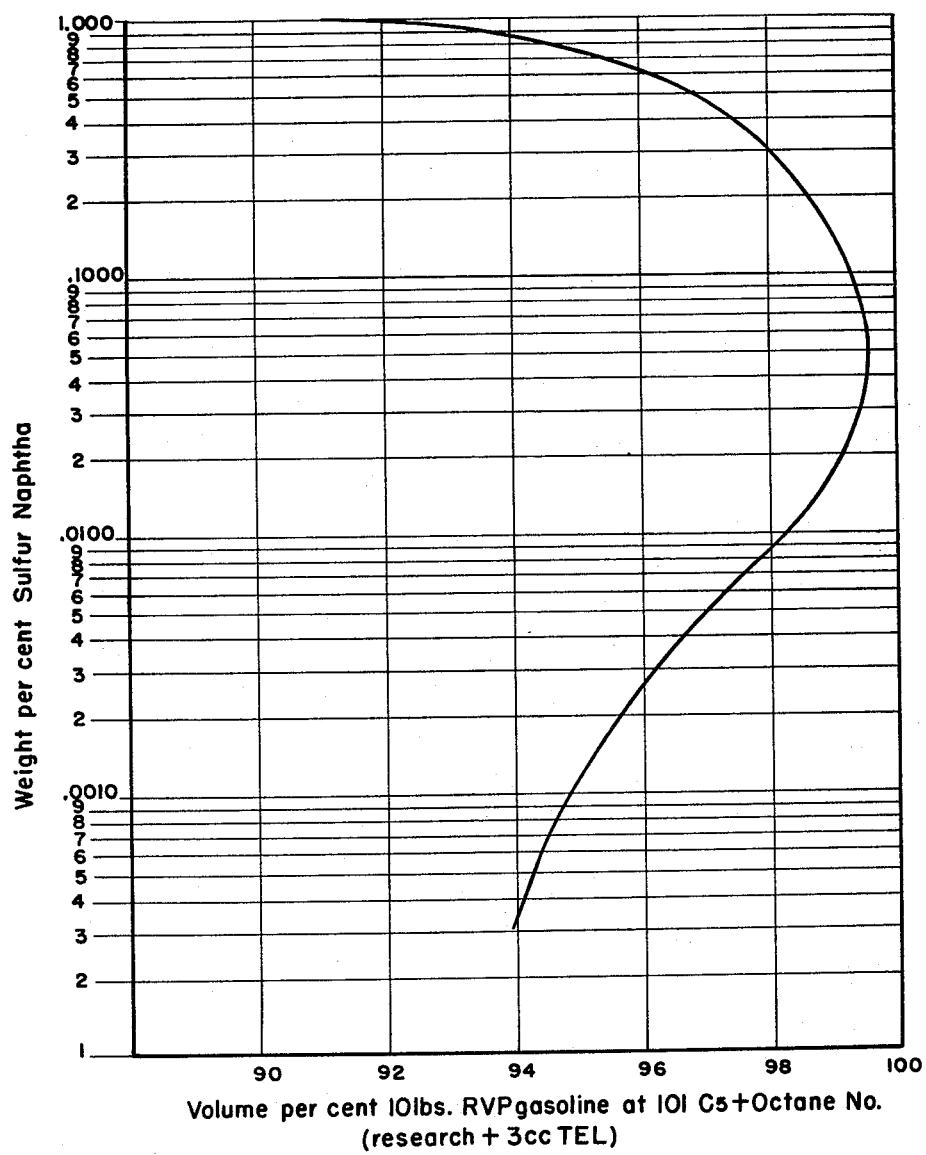

3,177,136
REFORMING WITH STEAMED PLATINUM CATALYST
William H. Lang, Wenonah, and Donald M. Nace, West Deptford Township, Gloucester County, N.J., assignors to Socony Mobil Oil Company, Inc., a corporation of New York
Filed Aug. 24, 1961, Ser. No. 133,623
2 Claims. (Cl. 208—139)

This invention relates to improvements in catalytic reforming. More particularly, the present invention relates to improvements in reforming of naphthas in the presence of controlled amounts of sulfur over steamed supported platinum group metal catalysts to produce improved yields of gasolines having high octane ratings.

In catalytic reforming of petroleum naphthas the following main hydrocarbon reactions occur: dehydrogenation of cyclohexanes to aromatics; dehydroisomerization of alkylcyclopentanes to aromatics; dehydrocyclization of paraffins and olefins to aromatics; isomerization of n-paraffins to isoparaffins; hydroisomerization of olefins to isoparaffins; isomerization of substituted aromatics; and hydrocracking of paraffins. Of the above reactions dehydrogenation of naphthenes to aromatics is the chief octane upgrading reaction.

It is well known in the art that supported platinum metal catalysts are utilized in the reforming of various standard naphtha charges to produce high octane gasolines. Commercial platinum reforming catalysts have two distinct types of catalytic sites. Platinum sites alone have the ability to dehydrogenate or hydrogenate hydrocarbons, the extent of which will depend on the thermodynamic equilibrium established by the hydrogen pressure and temperature. Olefins generated at the platinum sites are very reactive and are involved in multi-step reaction sequences which are of great importance in the production of high octane number molecular species. Acidic sites are responsible for intercepting the olefin intermediates. However, platinum sites are involved also in various single-step reactions, such as demethylation of paraffins and ring opening of cycloparaffins, which are not as effective in raising the octane number-yield relation of a gasoline as are the dual function catalyzed reactions. Similarly, the acid sites, if too active, can promote excessive degradation reactions which disrupt the desired reaction sequences of the dual function system. A proper balance of platinum function activity and of acid function activity is obviously needed for optimum reforming selectivity. However, this balance of function depends on several factors involved in the reforming process which vary from one specific operation to another. These factors are the composition of the naphtha charge, the operating conditions of the reformer and the quality (octane number and vapor pressure) of the gasoline product desired. It is therefore desirable to utilize a process wherein a platinum reforming catalyst can be used under controlled catalyst function conditions to provide the proper reaction conditions for the various different commercial naphtha charges. This would enable optimum results to be attained in the reforming process without replacing the catalyst for each different type of naphtha feed employed.

It is the object of this invention to provide a one-step process wherein hydrocarbon naphtha charges containing substantial amounts of alkylcyclopentanes can be reformed under controlled conditions over a steamed platinum metal catalyst to obtain improved gasoline yields at octane ratings (Research+3 cc. TEL) in excess of 100.

It is a further object of this invention to control the activity and selectivity of the steamed platinum metal catalyst utilized in the reforming process by the addition of a sulfur additive to the hydrocarbon naphtha to provide improved maximum yields of high octane gasolines.

These and other objects will become apparent to those skilled in the art by the further consideration of the following disclosure and appended claims.

A reforming process has been discovered which produces improved yields of high octane gasoline by reforming a hydrocarbon naphtha charge having an initial boiling point of about 140° F. and an end boiling point of about 400° F. containing at least about 20 mole percent alkylcyclopentanes in the presence of controlled amounts of sulfur-containing compounds over a steamed supported platinum metal catalyst utilizing conventional reforming conditions. Heretofore, the presence of sulfur-containing compounds in a crude naphtha was considered a detriment to a catalytic reforming process since the catalyst which is utilized can be readily poisoned by the sulfur resulting in a significant decrease of the activity and selectivity of the desirable reaction occurring in the upgrading operation of napthas. The present invention advantageously utilizes controlled concentrations of sulfur in the naphtha charge to partially poison active platinum sites of the steamed supported platinum metal catalyst and effectively increase the selectivity for the chief upgrading reaction of dehydrogenation and isomerization of alkylcyclopentanes to aromatics to obtain improved yields of gasolines having high octane ratings.

The hydrocarbon naphthas used in the process of this invention are those having an initial boiling point of about 140° F. and an end boiling point of about 400° F. To obtain the improvements in yields of the high octane gasoline, the hydrocarbon naphthas utilized contain at least 20 mole percent of alkylcyclopentanes. The alkylcyclopentanes present in the hydrocarbon naphthas used in the starting materials include those having a boiling point in excess of 140° F. and include the mono-, di-, tri-, tetra-, and penta-substituted alkylcyclopentanes. A typical naphtha used in this process is a "Wilmington naphtha" which contains approximately 34 mole percent alkylcyclopentanes. On the other hand, a typical "Mid-Continent naphtha" boiling in the range from about 180° F. to about 400° F. containing approximately 18 mole percent alkylcyclopentanes does not show any improvement in the high octane gasoline yields when using the process of this invention.

The naphthas which are used in the process as the starting materials are generally pre-treated to lower the nitrogen content and other catalytic poisons to several parts per million or less to prevent poisoning of the supported platinum metal catalyst. The severity of pre-treating necessary to accomplish the reduction of nitrogen derivatives and other catalytic poisons will reduce the sulfur content of the naphtha to a negligible quantity. The naphthas can be pre-heated using conventional known methods, i.e., by passing at elevated temperatures over a commercial cobalt oxidemolybdena-alumina catalyst. If the quantity of catalytic poisons do not exceed the amounts which are detrimental to catalytic reforming, pre-treatment of the naphtha charges is not necessary.

To achieve the improvements demonstrated by the process of this invention, a reducible sulfur compound can be added to the hydrocarbon naphtha charge. The reducible sulfur compound is one susceptible of hydrogentation to hydrogen sulfide in the reformer. Hydrogen sulfide itself can be added, if desired, to the hydrogen stream or recycle stream of a reformer in amounts sufficient to provide the desired sulfur content. Based on a sulfur weight percent of naphtha charged, sulfur concentrations of about .001 percent to about 0.7 percent, preferably .005 percent to 0.5 percent, will provide the improvements in yields of the high octane gasoline obtained in accordance with the present process.

The use of controlled amounts of sulfur in the reforming process of this invention is exceptional in its behavior since the presence of sulfur will only temporarily poison those sites of the platinum catalysts which produce the undesirable reactions obtained in reforming of naphthas. There are no permanent detrimental effects to the platinum catalysts in using sulfur. For instance, if higher platinum activity is required, the amounts of sulfur can be reduced and the platinum activity of the catalyst increases almost instantaneously. Correspondingly, if less platinum activity is desired, the amounts of sulfur present can be increased to obtain the instantaneous decrease of platinum activity.

Typical reducible sulfur compounds which can be used in this process include, for example, the organic mercaptans, sulfides, disulfides, and heterocyclic sulfur compounds, having boiling points within and below the naphtha boiling range such as, tertiary butyl mercaptan, tertiary hexyl mercaptan, ditertiary butyl sulfide, dinormal butyl sulfide; ditertiary-butyl disulfide; ditertiary octyl disulfide; thiophene; and the like; and as described previously, hydrogen sulfide in the form of a gas. The optimum concentration of sulfur will depend on the composition of the naphtha charge stock (particularly the concentration of alkylcyclopentanes), the platinum activity of a particular catalyst used and the severity of the reforming operation.

The catalyst which can be used in the process of this invention can be any known type of supported platinum metal catalyst containing a halide used for reforming which has been specially steam-treated. The steaming treatment of the catalyst utilized in the process of this invention is a process where a conventional platinum metal catalyst such as platinum or alumina catalyst containing small amounts of halide is subjected to a stream of an inert gas containing from about 50 to 100 mole percent steam for from about 1 to 72 hours. The steamed platinum metal catalyst can include those catalysts which are steamed for a duration of from 1 hour to as long as 3 days, preferably from about 2 hours to about 48 hours, in a temperature range of about 700° F. to about 900° F. or includes those catalysts steamed at higher temperatures from about 900° F. to about 1200° F. with steam alone or in the presence of an oxygen-containing inert gas such as air, oxygen alone, and the like for a period of time ranging from about 1 hour to about 3 days, preferably for about 4 hours to about 24 hours. Variations of the above described steaming process can be used to produce the steamed catalyst. For example, oxygen plus steam can be passed over the catalyst for a period of time, then the catalyst can be steamed without oxygen for a period of time or modifications thereof. The purpose of the steaming of the above described catalysts is to lower the acidity of the platinum metal actalyst by reducing the halide content therein. The steaming process reduces the acidity of the platinum metal catalyst not only by decreasing the chloride content but also by decreasing the catalyst's surface area. Reduction of acidity has the purpose of inhibiting substantially the undesirable reaction known to occur in reforming.

The term "platinum metal" as used throughout the specification and claims is meant to include any type of metal in the platinum series such as platinum, palladium, osmium, iridium, rhodium, and ruthenium, as well as alloys or mixtures of these metals. The amount of the platinum metal on the alumina support can range from about 0.01 percent to about 5 percent platinum metal, preferably from about 0.1 percent to about 2 percent by weight based on the total catalyst. The platinum metal portion of the catalyst can be incorporated into the catalyst support by impregnating or co-precipitating the same with a suitable compound of a platinum metal in accordance with procedures well known in the art, using, for example, platinum ammine complex, potassium chloroplatinate, chloroplatinic acid, platinum sulfide, palladium sulfide, rhodium sulfide, platinum polysulfide and the like.

The quantity of platinum impregnating material used in the catalyst preparation will depend on the final concentration of the platinum metal desired. The catalyst support of the platinum metal catalyst can be any suitable carrier material known in the art. These carriers include those inorganic oxide gels capable of maintaining halides thereon such as, for example, alumina, silica, silica-alumina, zirconia, silica-zirconia, magnesia, alumina-boria and the like. The preferred catalysts are those wherein the support or carrier is alumina having platinum deposited thereon and after steaming contain very small quantities of halides such as chlorine, fluorine and bromine in the range of from about 0 to 0.05 weight percent.

The conditions utilized in the process of this invention are the standard reforming conditions known to the art. The pressure in the reactors is maintained between about 50 and about 1000 p.s.i.g., preferably in the range from about 100 to about 750 p.s.i.g.; the inlet temperature of the reforming reactor ranges from about 880° F. to 1000° F., preferably in the range of 900° F. to 970° F. The liquid hourly space velocity of the naphtha charge per volume of catalyst can range from about 0.1 to about 10, preferably in the range of from 0.5 to 5. The molar ratio of hydrogen to hydrocarbon charge can range from about 2 to about 40, preferably in the range of about 3 to 20.

The process of this invention may be carried out in any equipment suitable for reforming operations. The process may be operated batchwise. It is preferable, however, and generally more feasible to operate continuously. Accordingly, the process is adapted to operations using a fixed bed of catalyst; also, the process can be operated using a moving bed of catalyst, wherein the hydrocarbon flow may be concurrent or countercurrent to the catalyst flow. A fluid type of operation may also be employed.

The following examples will serve to illustrate the process of the invention without limiting the same:

EXAMPLE 1

A charge of 50 cc. of platinum on alumina catalyst which contained 0.6 weight percent platinum and 0.7 weight percent chlorine was placed in a reactor. This charge was heated to 950° F. and processed four times with steam and/or oxygen by the following sequences:

(1) Oxygen bubbled through water at 200° F. passed over 500 cc. of catalyst at 950° F. for 5.5 hours (0.17 percent chlorine left on catalyst)
(2) Repeat of above (0.106 percent chlorine left on catalyst)
(3) 100 percent steam passed over catalyst at 950° F. for 4 hours (0.05 percent chlorine left on catalyst)
(4) 100 percent steam passed over catalyst at 950° F. for 6 hours (0.02 percent chlorine left on catalyst)

All of the above treatments were at atmospheric pressure. Flow rates were not measured.

EXAMPLE 2

A Wilmington naphtha having an initial boiling point of about 200° F. and an end boiling point of about 400° F. was pretreated at 700° F. over a cobalt oxide-molybdena-alumina pre-treating catalyst, at 500 p.s.i.g. and 5 liquid hourly space velocity to remove the nitrogen derivatives. The resulting naphtha having an A.P.I. gravity of 53.9 contained 0.0004 percent sulfur. The composition of the naphtha was 31.0 mole percent paraffins 52.5 mole percent monocycloparaffins (34 mole percent alkylcyclopentane), 10.3 mole percent alkylbenzenes, and 6.2 mole percent olefin and dicyclo compounds. The octane number of this naphtha (R+3 cc. TEL) was 83.8. The above pretreated naphtha was reformed to 104 octane number (Research+3 cc. TEL) $C_6+$ gasoline over a conventional platinum alumina reforming catalyst containing 0.6 weight percent platinum and 0.7 weight percent chlorine, said catalyst having a surface area of 430 square meters per gram and a steamed platinum on alumina catalyst of Example 1 which contains 0.02 weight percent of chlorine and has a surface area of 148 square meters per gram. The reforming operation was carried out in a fixed bed unit which used 75 cc. of catalyst under operating conditions of 500 p.s.i.g. pressure, a molar ratio of hydrogen to hydrocarbon charge of 10, and a liquid hourly space velocity of 2. The amounts of sulfur added to the naphtha charge varied as shown in the reforming results described in Table I, below.

Table I

| Catalyst | Addition of Sulfur to Naphtha, Wt. Percent | Temperature Requirement, Degrees | $C_6+$ Gaso. Yield Vol. Percent | $C_5+$ Gaso. Yield Vol. Percent | 10 lbs. RVP Gasoline Yield, Vol. Percent | Total $C_5$'s Vol. Percent | Total $C_4$'s Vol. Percent | Dry Gas, Wt. Percent |
|---|---|---|---|---|---|---|---|---|
| Untreated $Pt/Al_2O_3$ | | 958 | 65.1 | 74.4 | 83.0 | 9.3 | 9.8 | 14.7 |
| Steamed $Pt/Al_2O_3$ | | 984 | 70.7 | 78.0 | 88.0 | 7.3 | 6.7 | 11.3 |
| Do | 0.31 | 982 | 75.0 | 79.6 | 90.8 | 4.6 | 6.0 | 8.1 |

The above table I demonstrates the significant improvement of at least 2.8 volume percent gasoline yields utilizing a steamed platinum on alumina catalyst in the presence of a controlled amount of sulfur in the naphtha feed over a severely steamed platinum on alumina catalyst without the presence of sulfur. Additionally, Table I shows an improvement of at least 6.8 volume percent gasoline yields utilizing the steamed platinum on alumina plus sulfur over an untreated catalyst of platinum on alumina in the absence of sulfur.

EXAMPLE 3

Using the Wilmington naphtha (0.0004 weight percent sulfur) obtained in Example 2, above, which was pretreated to remove the nitrogen derivatives and other catalytic poisons, this naphtha was reformed using varying amounts of sulfur in the naphtha charge over a steamed platinum on alumina catalyst (Example 1) to obtain comparative maximum yield data of gasolines of a specific octane number (Research+3 cc. TEL) of 101 of $C_5+$ gasoline. The reforming operations were carried out in a fixed bed unit which used 75 cc. of catalyst under operation conditions of 500 p.s.i.g. pressure, a molar ratio of hydrogen to the hydrocarbon charge of 10, and a liquid hourly space velocity of 2. The resulting data is tabulated in Table II below and the accompanying FIGURE 1.

Table II

| Inlet Temperature, °F. | Sulfur Content in Naphtha Charge, Wt. Percent | Gasoline Yield of 10 lbs. R.V.P., Volume Percent |
|---|---|---|
| 955 | 0.0004 | 94.1 |
| 952 | .006 | 97.1 |
| 951 | .035 | 99.3 |
| 954 | .10 | 99.1 |
| 953 | .31 | 97.7 |
| 963 | .90 | 92.6 |

As is demonstrated by the above Table II and the accompanying FIGURE 1, sulfur concentrations from about .001 to about 0.7 weight percent based on the naphtha charge, produce gasoline yields significantly improved over yields outside of this range of sulfur. At a sulfur concentration less than .001 and greater than 0.7 weight percent in the naphtha charge, the selectivity of the catalyst is reduced significantly and improved high octane yields of gasoline will not be obtained. These results indicate that the amount of added sulfur in a naphtha charge is critical to obtain improved gasoline yields having octane numbers in excess of 100.

EXAMPLE 4

A Wilmington naphtha having an initial boiling point of about 200° F. and an end boiling point of about 400° F. was pre-treated at 700° F. over a cobalt oxide-molybdena-alumina pre-treating catalyst, at 500 p.s.i.g. and 5 liquid hourly space velocity to remove the nitrogen derivatives. The resulting naphtha having an A.P.I. gravity of 53.9 contained 0.0004 percent sulfur. The composition of the naphtha was 31.0 mole percent paraffins, 52.5 mole percent monocycloparaffins (34 mole percent alkylcyclopentanes), 10.3 mole percent alkylbenzenes, and 6.2 weight percent olefin and dicyclo compounds. The octane number of this naphtha (Research+3 cc. TEL) was 83.8. The above pre-treated naphtha was reformed over a conventional platinum alumina reforming catalyst containing 0.6 weight percent platinum and 0.7 weight percent chlorine and a steamed platinum on alumina catalyst of Example 1. The reforming operation was carried out in a conventional fixed bed unit which used 75 cc. of catalyst under operating conditions of 500 p.s.i.g. pressure, a molar ratio of hydrogen to hydrocarbon charge of 10, a liquid hourly space velocity of 2, and an inlet temperature of the naphtha charge of 900° F. to 960° F. The amounts of sulfur added to the naphtha charge varied as shown in the reforming results described in Table III below and the accompanying FIGURE 2.

Table III

CONVENTIONAL PLATINUM ON ALUMINA CATALYST CONTAINING 0.6 WT. PERCENT PLATINUM AND 0.7 WT. PERCENT CHLORINE

[Sulfur content in naphtha charge, 0.0004%]

| Inlet Temp., °F. | Octane Number (Research +3 cc. TEL) | $C_6+$Gasoline, Volume Percent | 10 lbs. R.V.P. Gasoline, Volume Percent |
|---|---|---|---|
| 905 | 98.3 | 82.5 | 98 |
| 925 | 100.8 | 76.2 | 92 |
| 948 | 103 | 67.8 | 85.5 |
| 954 | 103.6 | 65.4 | 83.2 |

[Sulfur content in naphtha charge, 0.31%]

| | | | |
|---|---|---|---|
| 907 | 98.8 | 83.8 | 99.4 |
| 929 | 100.5 | 77.8 | 94.8 |
| 959 | 103.5 | 68.1 | 86.0 |

STEAMED PLATINUM ON ALUMINA CATALYST (EXAMPLE 1)

[Sulfur content in naphtha charge, 0.0004%]

| | | | |
|---|---|---|---|
| 933 | 98.4 | 82.8 | 99.8 |
| 951 | 100.6 | 79 | 95 |
| 974 | 103.1 | 74 | 90.9 |
| 985 | 104.2 | 69 | 86.6 |

[Sulfur content in naphtha charge, 0.31%]

| | | | |
|---|---|---|---|
| 950 | 100.6 | 83.4 | 98.6 |
| 970 | 102.8 | 77.5 | 93.8 |
| 986 | 104.4 | 73.8 | 89.1 |

Figure 2:
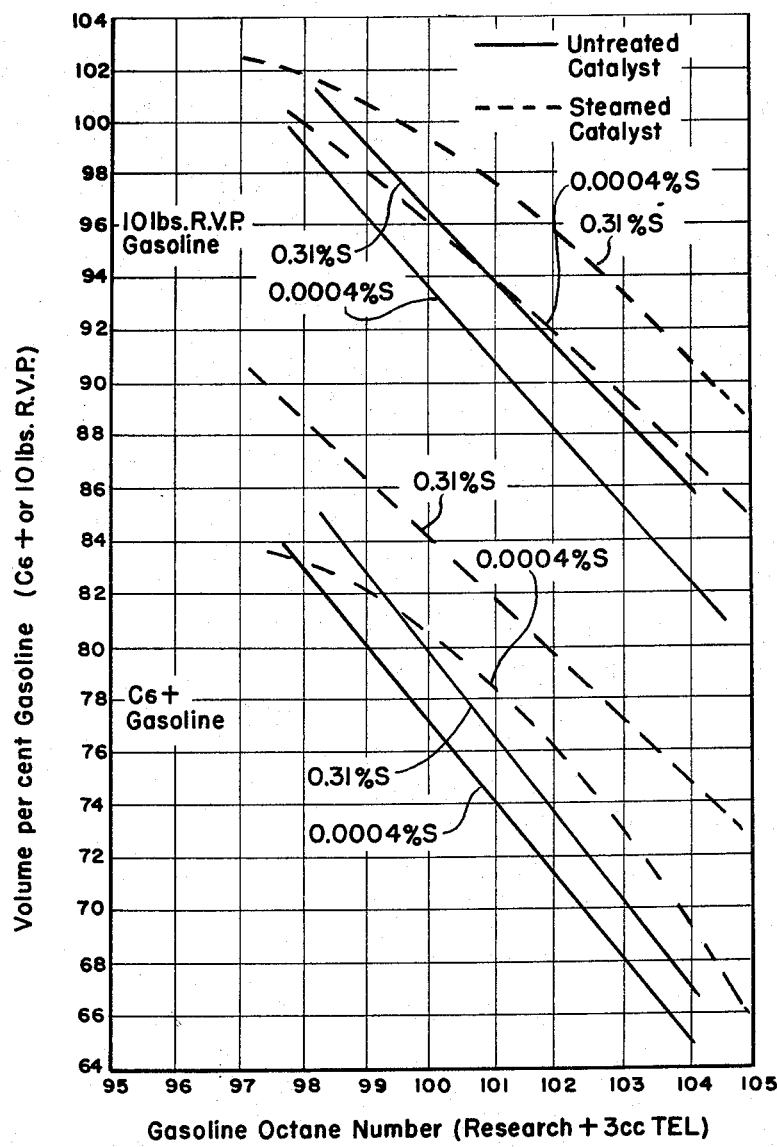

The results of Table III as tabulated in FIGURE 2 indicate overall improvements in gasoline yields having octane numbers greater than 100 when utilizing a steamed platinum on alumina catalyst with amounts of 0.31 weight percent of sulfur added to the naphtha charge over the steamed catalyst and negligible amounts of sulfur (i.e., 0.0004 wt. percent) in the naphtha charge. Significant improvements are also shown and demonstrated in the reforming of the naphthas over steamed platinum on alumina catalysts when compared to the untreated platinum on alumina catalyst, with or without added sulfur to the naphtha charge.

EXAMPLE 5

To demonstrate the correlating effect of the presence of sulfur and amounts of alkylcyclopentanes in the naphtha charge, two different pre-treated naphthas of varying alkylcyclopentane concentrations were reformed over the steamed reforming platinum on alumina catalyst as prepared in Example 1. The reforming operations were carried out in a fixed bed unit which used 75 cc. of catalyst under operating conditions of 500 p.s.i.g. pressure, a molar ratio of hydrogen to hydrocarbon charge of 10, and a liquid hourly space velocity of 2. The resulting data is tabulated in Table IV below.

Table IV

| Naphtha | | | | Moles/100 Moles Charged | | | | | | |
|---|---|---|---|---|---|---|---|---|---|---|
| | Mole percent | | Wt. percent S in Charge | Inlet Temperature | $C_5+$ O.N. R+3 cc. | Vol. percent $C_5+$ Yield | Cyclo-Paraffins | Aromatics | $C_6+$ Paraffins | Total Cyclics | Total $C_6+$ |
| | Total Cyclo-Paraffins | Cyclo-Pentanes | | | | | | | | | |
| Wilm., 200–400° F. | 58 | 34 | 0 | 950 | 100.4 | 83.7 | 3.6 | 55.3 | 28.7 | 58.9 | 87.6 |
| Boiling Fraction | | | 0.1 | 950 | 100.3 | 86.8 | 5.7 | 59.3 | 27.5 | 65.0 | 92.5 |
| Mid-Cont., 180–385° F. | 43 | 18 | 0 | 950 | 99.2 | 83.0 | 4.2 | 51.7 | 32.9 | 55.9 | 88.8 |
| Boiling Fraction | | | 0.08 | 950 | 98.9 | 83.4 | 3.6 | 52.5 | 32.5 | 56.1 | 88.6 |
| Mid-Cont., 150–250° F. | 44 | 26 | 0 | 980 | 101.2 | 64.9 | 0.7 | 34.9 | 22.0 | 35.6 | 57.6 |
| Boiling Fraction | | | 0.06 | 980 | 99.2 | 74.7 | 1.4 | 42.4 | 26.6 | 44.2 | 70.8 |

The results of Example 5 indicate that a specific amount of alkylcyclopentanes must be present in order to obtain improved yields of high octane gasolines when using the process of the present invention. The Wilmington naphtha containing 34 mole percent alkylcyclopentanes shows significant improvements in gasoline yields when sulfur is added. The Mid-Continent naphtha containing 18 mole percent alkylcyclopentanes does not show any improvements by addition of sulfur to the charge in its reforming process. It is significant that the reforming of the Mid-Continent naphtha produced almost identical results of the sulfur-added naphtha as compared to the non-sulfur-containing naphtha. If the alkylcyclopentanes concentration of the Mid-Continent naphtha is increased so that the mole percentage of alkylcyclopentanes would exceed 20 percent, improvements of gasoline yields are obtained when utilizing the process of this invention.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for reforming of a hydrocarbon naphtha which comprises passing a hydrocarbon naphtha having an initial boiling point of about 140° F. and an end boiling point of about 400° F. and containing at least about 20 mole percent of alkylcyclopentanes with sulfur in amounts ranging from about .0025 weight percent to about 0.6 weight percent based on the naphtha charge, in contact with a steamed platinum on alumina catalyst containing in the range of from about 0.1 to about 5 weight percent platinum and less than about .05 weight percent halogen under reforming conditions.

2. A method for reforming a pre-treated hydrocarbon naphtha which comprises passing a hydrocarbon naphtha having an initial boiling point of about 140° F. and an end boiling point of about 400° F. and containing at least about 20 mole percent of alkylcyclopentanes with sulfur in amounts of from about .009 weight percent to about 0.3 weight percent based on the naphtha charge, over a steamed platinum on alumina catalyst containing from about 0.1 to about 5 weight percent platinum and less than about .05 weight percent halogen under reforming conditions.

References Cited by the Examiner

UNITED STATES PATENTS

| 2,508,014 | 5/50 | Davidson | 208—141 |
| 2,550,531 | 4/51 | Ciapetta | 208—138 |
| 2,861,944 | 11/58 | Coley et al. | 208—138 |
| 3,006,841 | 10/61 | Haensel | 208—139 |

ALPHONSO D. SULLIVAN, *Primary Examiner.*

DANIEL E. WYMAN, *Examiner.*

UNITED STATES PATENT OFFICE
CERTIFICATE OF CORRECTION

Patent No. 3,177,136　　　　　　　　　　　　　April 6, 1965

William H. Lang et al.

It is hereby certified that error appears in the above numbered patent requiring correction and that the said Letters Patent should read as corrected below.

Column 2, line 53, for "pre-heated" read -- pre-treated --; column 3, line 53, for "actalyst" read -- catalyst --.

Signed and sealed this 24th day of August 1965.

(SEAL)
Attest:

ERNEST W. SWIDER
Attesting Officer

EDWARD J. BRENNER
Commissioner of Patents